United States Patent [19]

Shingo et al.

[11] Patent Number: 5,011,882

[45] Date of Patent: Apr. 30, 1991

[54] AQUEOUS COATING COMPOSITION

[75] Inventors: Naohito Shingo, Katano; Takahito Kishida, Yao, both of Japan

[73] Assignee: Nippon Paint Co., Ltd., Osaka, Japan

[21] Appl. No.: 197,447

[22] Filed: May 20, 1988

[30] Foreign Application Priority Data

May 20, 1987 [JP] Japan .................................. 62-122733

[51] Int. Cl.$^5$ ................................................ C08L 51/00
[52] U.S. Cl. ....................................... 524/504; 524/502
[58] Field of Search .............................................. 524/504

[56] References Cited

U.S. PATENT DOCUMENTS

| | | | |
|---|---|---|---|
| 3,821,145 | 6/1974 | Walus | 524/504 |
| 4,329,266 | 5/1982 | Suzuki et al. | 524/504 X |
| 4,510,275 | 4/1985 | Ihikura et al. | 523/412 |
| 4,528,318 | 7/1985 | Konishi et al. | 524/504 |
| 4,581,395 | 4/1986 | Nakaya et al. | 523/410 |
| 4,624,973 | 11/1986 | Kuwajima et al. | 524/504 X |
| 4,731,409 | 3/1988 | Miwa et al. | 524/504 X |

FOREIGN PATENT DOCUMENTS 2131437A 6/1984 United Kingdom .

*Primary Examiner*—Joseph L. Schofer
*Assistant Examiner*—T. M. Reddick
*Attorney, Agent, or Firm*—Wenderoth, Lind & Ponack

[57] ABSTRACT

An aqueous coating composition comprising (A) 100 parts by weight of an acrylic resin powder having an acid value of 15 to 200, (B) 25 to 900 parts by weight of an acrylic graft polymer having an acid value of 20 to 100, which is composed of a polymer portion (1) having an acid value of not more than 15 and an acrylic polymer portion (2) having an acid value of 40 to 200, and (C) 3 to 900 parts by weight of a curing agent for curing the component (A) and/or (B).

5 Claims, No Drawings

AQUEOUS COATING COMPOSITION

FIELD OF THE INVENTION

The present invention relates to an aqueous coating composition which has excellent coating workability and appearance, especially sag resistance and gloss.

BACKGROUND OF THE INVENTION

An organic solvent based paint has generally been approved, but attempts have now been made to change to an aqueous solvent based paint from the viewpoint of saving energy source and environmental pollution. Such an aqueous solvent based paint employs a resin which is soluble or dispersible in an aqueous medium. In order to enhance coating workability of the aqueous solvent based paint, it has been proposed that resin powder is formulated into it. However, the aqueous paint is not sufficient in dispersion stability and water resistance. The above defects have been recently improved by many efforts to provide an aqueous paint having good characteristics (for example, Japanese Patent Publication (examined) 13508/1986).

In order to obtain high gloss, it is required that the resin powder is finely dispersed in an aqueous paint containing a resin powder. The obtained aqueous paint is insufficent in sag resistance, especially at a high humidity. If a concentration of the resin powder is increased in such a finely dispersed paint to enhance sag resistance, then gloss is deteriorated. It therefore is difficult to reconcile sag resistance and appearance.

BRIEF EXPLANATION OF PRIOR ART

It is disclosed in Japanese Patent Publication (unexamined) Nos. 107090/1974, 107091/1974, 107092/1974, 49759/1981 and 19760/1981 that an acrylic graft polymer is neutralized with a base and dispersed in an aqueous medium. These publications are silent not only on a specific combination of the acrylic resin powder and the acrylic graft polymer of the present invention, but also on the excellent technical effects in sag resistance and appearance (especially gloss).

SUMMARY OF THE INVENTION

As a result of studying a combination of various resin powders and various polymers, the present inventors have found that a combination of a specific acrylic graft polymer and a specific resin powder provides an aqueous coating composition which has excellent sag resistance and gloss even at a condition of a high humidity.

The present invention provides an aqueous coating composition comprising (A) 100 parts by weight of an acrylic resin powder having an acid value of 15 to 200, (B) 25 to 900 parts by weight of an acrylic graft polymer having an acid value of 20 to 100, which is composed of a polymer portion (1) having an acid value of not more than 15 and an acrylic polymer portion (2) having an acid value of 40 to 200, and (C) 3 to 900 parts by weight of a curing agent for curing the component (A) and/or (B). All parts are based on the solid content.

DETAILED DESCRIPTION OF THE INVENTION

The aqueous coating composition of the present invention employs an acrylic resin powder having an acid value of 15 to 200. The above range of acid value is required for dispersion stability. Acid values less than 15 reduce dispersion stability and those more than 200 deteriorate water resistance. The resin powder may also have a hydroxyl group other than an acid group, to give a hydroxyl value of 10 to 100. The hydroxyl group makes it easier to finely disperse the resin powder. An average particle size of the resin powder in the coating composition of the present invention is preferably not more than 5 micron, more preferably not more than 2 micron for obtaining high gloss. The resin powder can be obtained by a conventional polymerization method of an acrylic unsaturated acid and another copolymerizable unsaturated monomer.

Non-limiting examples of the acrylic unsaturated acids are an acrylic carboxylic acid, such as acrylic acid, methacrylic acid, crotonic acid, itaconic acid, maleic acid, maleic anhydride and fumaric acid; an acrylic sulfonic acid, such as 2-acrylamide-2-methylpropane sulfonic acid; an acrylic phosphoric acid, such as monophosphoric acid ester of hydroxyalkyl (meth)acrylate; and a mixture thereof Representative examples of the copolymerizable unsaturated monomers are (meth)acrylates, such as methyl (meth)acrylate, ethyl (meth)acrylate, propyl (meth)acrylate, isopropyl (meth)acrylate, butyl (meth)acrylate, hexyl (meth)acrylate, octyl (meth)acrylate, lauryl (meth)acrylate, methoxybutyl (meth)acrylate, methoxyethyl (meth)acrylate, ethoxybutyl (meth)acrylate, allyl (meth)acrylate, hydroxyethyl (meth)acrylate, hydroxypropyl (meth)acrylate, diethylaminoethyl (meth)acrylate, methylaminoethyl (meth)acrylate, allyloxyethyl (meth)acrylate and the like; (meth)acrylic amids, such as N-methylol (meth)acrylamide, N-alcoxymethylol (meth)acrylamide (for example N-isobuthoxymethylol (meth)acrylamide) and the like; vinyl aromatic compounds, such as styrene, alpha-methylstyrene, vinyl toluene, p-chlorostyrene, vinyl pyridine and the like; (meth)acrylonitrile; methyl isopropenyl ketone; and the like. The monomer can be employed solely or in combination. Selection of the monomers listed above is made according to desired characteristics. An amount of the monomer is decided so as to be sufficient to obtain a desired acid value or a desired hydroxyl value. If a hydroxyl value is necessary, an unsaturated monomer having a hydroxyl group among the listed monomers is employed.

A resin powder may be prepared by melting the obtained resin with stirring and then grinding, or by obtaining resin particles by emulsion polymerization or dispersion polymerization. Any conventional preparation methods are usable for the resin powder of the present invention.

The component (B) employed in the aqueous coating composition of the present invention is a neutralized acrylic graft polymer. The acrylic graft polymer is composed of a polymer portion (1) having an acid value of not more than 15 and an acrylic polymer portion (2) having an acid value of 40 to 200 and has as a whole an acid value of 20 to 100. The acrylic graft polymer can be obtained by many methods. For example, an acrylic polymer portion (1) having an acid value of not more than 15 may be preliminary formed and thereafter an acrylic polymer portion (2) having an acid value of 40 to 200 is grafted to it. Also, the acrylic polymer portion (2) may be prepared and grafted by the acrylic polymer portion (1). The method of graft polymerization is not limited. A graft point is formed from functional groups reactive with each other.

An acrylic graft polymer having a graft point made by a glycidyl group and an acid group is hereinafter explained as one example: A polymer is prepared by polymerizing a mixture of the acrylic unsaturated acid mentioned above and the copolymerizable monomer mentioned above in the presence of a catalyst in an organic solvent. An acid group of the polymer is reacted with a glycidyl group-containing unsaturated monomer and then polymerized with the other monomers to form a graft polymer. Polymerization can be carried out in the presence of a catalyst in an organic solvent. Examples of the organic solvents are those dissolving the obtained acrylic graft polymer, for example, alcohols, such as methyl alcohol, ethyl alcohol, propyl alcohol, butyl alcohol, furfuryl alcohol, cyclohexanol and the like; polyhydric alcohols, such as ethylene glycol, diethylene glycol, triethylene glycol, propylene glycol and the like; ketons, such as acetone, methyl ethyl ketone, diacetone alcohol and the like; esters, such as ethyl acetate, butyl acetate and the like; mono- or di-ether of lower alkyl, such as ethylene glycol monomethyl ether, ethylene glycol monoethyle ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monobutyl ether, diethylene glycol dimethyl ether, diethylene glycol diethyl ether, diethylene glycol dibutyl ether, dipropylene glycol methyl ether, dipropylene glycol ethyl ether, dipropylene glycol butyl ether and the like; hydrocarbons, such as cyclohexane, toluene, xylene, hexane, heptane, Solvesso #100 and #150 available from Exxon Co., Ltd. and the like; and a mixture thereof. A polymerization initiator, such as azo compounds, peroxide compounds, sulfide compounds, sulfine compounds, diazo compounds, nitroso compounds, and redox compounds can also be employed. The glycidyl group-containing unsaturated monomer includes glycidyl (meth)acrylate, allylglycidyl ether, methylglycidyl (meth)acrylate, a mixture thereof and the like. A reaction with the glycidyl group-containing unsaturated monomer can be carried out in the presence of a catalyst, for example quaternary ammonium salts, such as tetramethylammonium bromide; tertiary alkylamines, such as trimethylamine and triethylamine; benzylamines, such as dimethylbenzylamine; pyridines; tertiary alkanolamines, such as dimethylethanolamine; and the like.

The obtained acrylic graft polymer has a polymer portion (1) having an acid value of not more than 15, preferably not more than 3 (including 0) and an acrylic polymer portion (2) having an acid value of 40 to 200, preferably 50 to 150. Acid values less than 40 in the acrylic polymer portion reduce the hydrophilic nature of the obtained acrylic graft polymer, which makes it difficult to disperse in water or which, if dispersed in water, makes it very unstable. When the acid value is more than 200, the obtained film is short of water resistance.

The acrylic graft polymer, as a whole, has an acid value of 20 to 100, preferably 30 to 70. When the acid value is less than 20, it is difficult to obtain a stable aqueous dispersion. When it is more than 100, the viscosity of the aqueous dispersion becomes high and its water resistance also becomes poor.

The acrylic graft polymer of the present invention has a wide variety of number average molecular weights to cope with a desired usage, but it is generally within the range of about 2,000 to about 50,000, preferably 3,000 to 10,000. When the reaction is a free radical polymerization, the molecular weight of the graft polymer can be adjusted by, for example, use of a chain transfer agent, such as mercaptane, carbon tetrachloride and the like; selection of types and amount of a polymerization catalyst; the polymerization temperature, selection of types and amount of organic solvent; and the like.

The acrylic graft polymer is water-dispersed neatly or after removing a solvent to form an aqueous dispersion. The aqueous dispersion may be prepared by dispersing the polymer in water and neutralizing at least 60% of an acid groups, especially a carboxylic group of the graft polymer with a basic material. The amount of water in the dispersion may be 55 to 85% by weight based the total amount of the dispersion. The basic material, i.e. neutralizing agent includes ammonia, an amine, a hydroxide of alkaline metal, and the like. The amine can be a primary, secondary or tertiary alkyl amine; a primary, secondary or tertiary alkanol amine; a cycloalkylamine; and the like. The hydroxide of alkaline metal includes potassium hydroxide, sodium hydroxide and the like.

The curing agent (C) employed in the present invention is one which cures the component (A) and/or the component (B), for example a polyepoxide compound, a polyblocked isocyanate, an aminoplast and the like.

The weight ratio of the component (A)/(B) is 1/9 to 8/2, preferably 3/7 to 7/3. Weight ratios less than 1/9 deteriorate sag-resistance, and weight ratios more than 8/2 become poor in gloss.

The acrylic graft polymer of the present invention may contain a hydroxyl group which acts as a crosslinking point. The hydroxyl group can be incorporated into the acrylic graft polymer by emplying an unsaturated monomer having a hydroxyl group. The hydroxyl value of the acrylic graft polymer is preferably 20 to 200, more preferably 30 to 150. Hydroxyl values less than 20 are insufficient in crosslinking properties, and those more than 200 deteriorate water resistance.

When the component (C) is an aminoplast resin, it is preferred that the acrylic graft polymer contains a sulfonic acid group or a phophoric acid group to enhance curing properties. For introducing it, a sulfonic acid group-containing monomer or phosphoric acid group-containing monomer is usually used as monomers of the graft polymer in an amount of not more than 10% by weight.

The resin powder (A) may be dispersed in the aqueous dispersion of the component (B) by heat, a sand grinder mill and so on. As is the same as a conventional resin dispersing process, heat dispersing is preferred in view of dispersion stability The resin powder may be further ground during dispersing. In general, it is preferred that a resin powder having a particle size of about 100 micron is ground to about 5 micron in the composition of the present invention.

An inorganic or organic pigment may be formulated into the composition of the present invention. The pigment can be preliminary mixed with each component (A), (B) or (C) if desired. If preliminary mixed with the component (B), it may be added directly to the aqueous dispersion of the acrylic graft polymer and dispersed by a dispersing apparatus, such as a disper, a steel ball mill, a sand mill, an atomizer, a roll mill and the like. The pigment may also be formulated into an organic type solution prior to neutralizing the acrylic graft polymer Further, the pigment may be mixed with the component (C) and then dispersed as mentioned above.

If necessary, another additive, such as an acid catalyst, a defoaming agent, a leveling agent, a ultraviolet absorbent and the like may be formulated into the coating composition of the present invention. Further, in order to improve coating properties, another component, such as a cellulose derivative, an epoxy resin, a vinyl type acrylic resin and the like may also be formulated within the scope of the present invention.

The aqueous coating composition of the present invention enhances sag resistance by the combination of the specific acrylic graft polymer with the acrylic resin powder.

EXAMPLES

The present invention is illustrated by the following examples, which are not to be construed as limiting the scope of the present invention to their details. In Examples, part and % are based on weight.

REFERENCE EXAMPLE

Preparation of an Aqueous Resin Varnish (I)

The term "varnish" hereinafter means a solution containing a neutralized acrylic graft polymer and water.

A flask was charged with 27 parts of ethylene glycol monobutyl ether, 27 parts of Solvesso 150 (an organic solvent available from Exxon Corp.) and heated to 135° C. with stirring. Then, a mixture of 16 parts of styrene, 18.5 parts of methyl methacrylate, 27.5 parts of 2-ethylhexyl acrylate, 21 parts of ethyl acrylate, 15 parts of 2-hydroxyethyl acrylate, 2 parts of glycidyl methacrylate and 7 parts of t-butylperoxy-2-ethyl hexanoate was added dropwise at 135° C. at which it was maintained for 30 minutes. Two mixtures were added dropwise for 2 hours at 135° C., one of which contained 13.5 parts of styrene, 13 parts of methyl methacrylate, 13.2 parts of 2-ethylhexyl acrylate, 17.8 parts of ethyl acrylate, 12.5 parts of 2-hydroxyethyl acrylate, 13 parts of methacrylic acid and 7 parts of t-butylperoxy-2-ethyl hexanoate, and the other of which contained 4 parts of 2-acrylamide-2-methylpropane sulfonic acid, 5 parts of ethylene glycol, 3.4 parts of dimethylethanolamine and 5.6 parts of ethylene glycol monobutyl ether. The obtained mixture was kept for 30 minutes and then a mixture of 0.4 parts of t-butylperoxy-2-ethyl hexanoate and 1 part of ethylene glycol monobutyl ether was added dropwise over 30 minutes. The obtained mixture was aged for 3 hours at 135° C. to obtain a reaction product which was neutralized with 13.9 parts of dimethylethanolamine. Next, 400 parts of water was added to obtain an aqueous resin varnish. Characteristics of the obtained graft polymer are shown in Table 1.

Preparation of an Aqueous Resin Varnish (II)

A flask was charged with 53 parts of ethylene glycol monobutyl ether and heated to 130° C. with stirring. Then, a mixture of 5 parts of styrene, 40 parts of methyl methacrylate, 38 parts of 2-ethylhexyl acrylate, 15 parts of 2-hydroxyethyl acrylate, 2 parts of glycidyl methacrylate and 7 parts of t-butylperoxy-2-ethyl hexanoate was added dropwise at 130° C. at which it was maintained for 30 minutes. Two mixtures were added dropwise for 2 hours at 130° C., one of which contained 5 parts of styrene, 40 parts of methyl methacrylate, 34.1 parts of 2-ethylhexyl acrylate, 14 parts of 2-hydroxyethyl acrylate, 6.9 parts of methacrylic acid and 7 parts of t-butylperoxy-2-ethyl hexanoate, and the other of which contained 5 parts of 2-acrylamide-2-methylpropane sulfonic acid, 5 parts of ethylene glycol, 4.3 parts of dimethylethanolamine and 5.7 parts of ethylene glycol monobutyl ether. The obtained mixture was kept for 30 minutes and then a mixture of 0.4 parts of t-butylperoxy-2-ethyl hexanoate and 1 part of ethylene glycol monobutyl ether was added dropwise over 30 minutes. The obtained mixture was aged for 3 hours at 130° C. to obtain a reaction product which was neutralized with 8 parts of dimethylethanolamine. Next, 406 parts of water was added to obtain an aqueous resin varnish. Characteristics of the obtained graft polymer are shown in Table 1.

Preparation of an Aqueous Resin Varnish (III)

A flask was charged with 67 parts of ethylene glycol monobutyl ether and heated to 130° C. with stirring. Then, a mixture of 9.6 parts of styrene, 11.4 parts of methyl methacrylate, 16.8 parts of 2-ethylhexyl acrylate, 12.6 parts of ethyl acrylate, 9 parts of 2-hydroxyethyl acrylate, 0.6 parts of glycidyl methacrylate and 1.1 parts of t-butylperoxy-2-ethyl hexanoate was added dropwise for 2 hours at 135° C. at which it was maintained for 30 minutes. A mixture containing 21.4 parts of styrene, 22.4 parts of methyl methacrylate, 33.6 parts of 2-ethylhexyl acrylate, 25.2 parts of ethyl acrylate, 16.8 parts of 2-hydroxyethyl acrylate, 20.6 parts of acrylic acid, 1 part of dimethylethanolamine and 9.8 parts of t-butylperoxy-2-ethyl hexanoate was added dropwise for 2 hours at 135° C. The obtained mixture was kept for 30 minutes and then a mixture of 0.4 parts of t-butylperoxy-2-ethyl hexanoate and 1 part of ethylene glycol monobutyl ether was added dropwise over 30 minutes. The obtained mixture was aged for 3 hours at 135° C. to obtain a reaction product which was neutralized with 28.5 parts of triethylamine. Next, 382 parts of water was added to obtain an aqueous resin varnish. Characteristics of the obtained graft polymer are shown in Table 1.

Preparation of an Aqueous Resin Varnish (IV)

A flask was charged with 67 parts of ethylene glycol monobutyl ether and heated to 125° C. with stirring. Then, a mixture of 6 parts of styrene, 40 parts of methyl methacrylate, 38 parts of 2-ethylhexyl acrylate, 15 parts of 2-hydroxyethyl acrylate, 1 parts of glycidyl methacrylate and 5 parts of t-butylperoxy-2-ethyl hexanoate was added dropwise for 2 hours at 125° C. at which it was maintained for 30 minutes. A mixture containing 10 parts of styrene, 26 parts of methyl methacrylate, 13.1 parts of 2-ethylhexyl acrylate, 36 parts of ethyl acrylate, 14 parts of 2-hydroxyethyl acrylate, 3.9 parts of acrylic acid, 1 part of dimethylethanolamine and 5 parts of t-butylperoxy-2-ethyl hexanoate was added dropwise for 2 hours at 135° C. The obtained mixture was kept for 30 minutes and then a mixture of 0.4 parts of t-butylperoxy-2-ethyl hexanoate and 1 part of ethylene glycol monobutyl ether was added dropwise over 30 minutes. The obtained mixture was aged for 3 hours at 130° C. to obtain a reaction product which was neutralized with 8 parts of dimethylethanolamine. Next, 406 parts of water was added to obtain an aqueous resin varnish. Characteristics of the obtained graft polymer are shown in Table 1.

Preparation of an Aqueous Resin Varnish (V)

A flask was charged with 68 parts of ethylene glycol monobutyl ether and heated to 120° C. with stirring.

Then, a mixture of 15 parts of styrene, 30 parts of methyl methacrylate, 27.5 parts of 2-ethylhexyl acrylate, 13.5 parts of ethyl acrylate, 14 parts of 2-hydroxyethyl acrylate and 4 parts of azobisisobutylonitrile was added dropwise for 2 hours at 120° C. at which it was maintained for 30 minutes. A mixture containing 14 parts of styrene, 15 parts of methyl methacrylate, 25 parts of 2-ethylhexyl acrylate, 19 parts of ethyl acrylate, 14 parts of 2-hydroxyethyl acrylate, 13 parts of methacrylic acid and 4 parts of azobisisobutylonitrile was added dropwise for 2 hours at 120° C. The obtained mixture was kept for 30 minutes and then a mixture of 0.4 parts of t-butylperoxy-2-ethyl hexanoate and 1 part of ethylene glycol monobutyl ether was added dropwise over 30 minutes. The obtained mixture was aged for 3 hours at 120° C. to obtain a reaction product which was neutralized with 13.5 parts of dimethylethanolamine. Next, 395 parts of water was added to obtain an aqueous resin varnish. Characteristics of the obtained graft polymer are shown in Table 1.

Preparation of an Aqueous Resin Varnish (VI)

A flask was charged with 65 parts of ethylene glycol monobutyl ether and heated to 120° C. with stirring. Then, a mixture of 15 parts of styrene, 20 parts of methyl methacrylate, 26.5 parts of 2-ethylhexyl acrylate, 20 parts of ethyl acrylate, 15 parts of 2-hydroxyethyl acrylate, 2.3 parts of methacrylic acid and 4 parts of azobisisobutylonitrile was added dropwise for 3 hours at 120° C. at which it was maintained for 30 minutes. A mixture of 0.4 parts of t-butylperoxy-2-ethyl hexanoate and 1 part of ethylene glycol monobutyl ether was added for 30 minutes and aged for 3 hours at 120° C. The obtained mixture was cooled to 100° C. and 1.2 parts of glycidyl methacrylate, 0.1 part of hydroquinone and 1 part of dimethylethanolamine were added and reacted for 3 hours at 100° C. Its acid value was 10.1.

Next, the reaction mixture was heated to 120° C. and a mixture containing 14 parts of styrene, 15 parts of methyl methacrylate, 23 parts of 2-ethylhexyl acrylate, 21.5 parts of ethyl acrylate, 13.5 parts of 2-hydroxyethyl acrylate, 13 parts of methacrylic acid and 4 parts of azobisisobutylonitrile was added dropwise for 3 hours at 120° C. The obtained mixture was kept for 30 minutes and then a mixture of 0.4 parts of t-butylperoxy-2-ethyl hexanoate and 1 part of ethylene glycol monobutyl ether was added dropwise over 30 minutes. The obtained mixture was aged for 3 hours at 120° C. to obtain a reaction product which was neutralized with 17.1 parts of triethylamine. Next, 392 parts of water was added to obtain an aqueous resin varnish. Characteristics of the obtained graft polymer are shown in Table 1.

Preparation of an Aqueous Resin Varnish (VII)

A flask was charged with 65 parts of ethylene glycol monobutyl ether and heated to 120° C. with stirring. Then, a mixture of 13 parts of styrene, 19 parts of methyl methacrylate, 26 parts of 2-ethylhexyl acrylate, 20 parts of ethyl acrylate, 15 parts of 2-hydroxyethyl acrylate, 5 parts of methacrylic acid and 4 parts of azobisisobutylonitrile was added dropwise for 3 hours at 120° C. at which it was maintained for 30 minutes. A mixture of 0.4 parts of t-butylperoxy-2-ethyl hexanoate and 1 part of ethylene glycol monobutyl ether was added for 30 minutes and aged for 3 hours at 120° C. The obtained mixture was cooled to 100° C. and 2 parts of glycidyl methacrylate, 0.1 part of hydroquinone and 1.5 parts of dimethylethanolamine were added and reacted for 3 hours at 100° C. Its acid value was 24.2.

Next, the reaction mixture was heated to 120° C. and a mixture containing 14 parts of styrene, 15 parts of methyl methacrylate, 23 parts of 2-ethylhexyl acrylate, 21.5 parts of ethyl acrylate, 13.5 parts of 2-hydroxyethyl acrylate, 13 parts of methacrylic acid and 4 parts of azobisisobutylonitrile was added dropwise for 3 hours at 120° C. The obtained mixture was kept for 30 minutes and then a mixture of 0.4 parts of t-butylperoxy-2-ethyl hexanoate and 1 part of ethylene glycol monobutyl ether was added dropwise over 30 minutes. The obtained mixture was aged for 3 hours at 120° C. to obtain a reaction product which was neutralized with 19.7 parts of triethylamine. Next, 389 parts of water was added to obtain an aqueous resin varnish. Characteristics of the obtained graft polymer are shown in Table 1.

Preparation of an Aqueous Resin Varnish (VIII)

A flask was charged with 34 parts of ethylene glycol monobutyl ether and heated to 125° C. with stirring. Then, a mixture of 14.5 parts of styrene, 17.5 parts of methyl methacrylate, 24 parts of 2-ethylhexyl acrylate, 25 parts of ethyl acrylate, 12.5 parts of 2-hydroxyethyl acrylate, 7 parts of methacrylic acid and 7 parts of t-butylperoxy-2-ethyl hexanoate was added dropwise for 3 hours at 120° C. at which it was maintained for 30 minutes. A mixture of 0.4 parts of t-butylperoxy-2-ethyl hexanoate and 1 part of ethylene glycol monobutyl ether was added for 30 minutes and aged for 3 hours at 125° C.

The obtained reaction product was neutralized with 7.2 parts of dimethylethanolamine. Next, 392 parts of water was added to obtain an aqueous resin varnish. Characteristics of the obtained non-grafted polymer are shown in Table 1.

Preparation of an Aqueous Resin Varnish (IX)

A flask was charged with 130 parts of xylene and heated to 130° C. with stirring. Then, a mixture of 15 parts of styrene, 30 parts of methyl methacrylate, 29 parts of 2-ethylhexyl acrylate, 8 parts of ethyl acrylate, 16 parts of 2-hydroxyethyl acrylate, 1 part of methacrylic acid and 4 parts of azobisisobutylonitrile was added dropwise for 3 hours at 130° C. at which it maintained for 30 minutes. A mixture of 0.5 parts of t-butylperoxy-2-ethyl hexanoate and 3 parts of xylene was added for 15 minutes and continued to mix for 30 minutes at 130° C. Its acid value was 6.4.

Next, the reaction mixture was heated to 130° C. and a mixture containing 8 parts of styrene, 30 parts of methyl methacrylate, 36.5 parts of 2-ethylhexyl acrylate, 12.5 parts of 2-hydroxyethyl acrylate, 13 parts of methacrylic acid and 4 parts of azobisisobutylonitrile was added dropwise for 3 hours at 120° C. The obtained mixture was kept for 5 hours. After removing xylene in the obtained mixture, 68 parts of diethylene glycol monobutyl ether was added and mixed. Then, 16.5 parts of triethylamine was added and 392 parts of water was added to obtain an aqueous resin varnish. Characteristics of the obtained graft polymer are shown in Table 1.

TABLE 1

| Aqueous varnish | (I) | (II) | (III) | (IV) | (V) | (VI) | (VII) | (VIII) | (IX) |

TABLE 1-continued

| | | | | | | | | | |
|---|---|---|---|---|---|---|---|---|---|
| Acid value of polymer portion (1) | 0 | 0 | 0 | 0 | 0 | 10.1 | 24.2 | —* | 6.4 |
| Acid value of acrylic polymer portion (2) | 92.4 | 56.6 | 110.8 | 29.6 | 83.1 | 83.1 | 83.1 | — | 84.7 |
| Acid value of acrylic graft polymer | 42.2 | 24.5 | 77 | 12.9 | 41.6 | 47.1 | 54 | 44.1 | 44.8 |
| Polymer portion (1)/ acrylic polymer portion (2) | 1/1 | 1/1 | 3/7 | 1/1 | 1/1 | 1/1 | 1/1 | — | 1/1 |
| Solid content of aqueous dispersion | 30 | 30 | 30 | 30 | 30 | 30 | 30 | 30 | 30 |

*This is not grafted.

Preparation of Pigment Paste (I)

Fifteen grams of water was added to 100 g of the aqueous varnish (I) and then 90 g of rutile type titanium pigment was added and pre-mixed. It was, next, ground in glass beads by a paint conditioner for 40 minutes at room temperature to form a pigment paste having a particle size of less than 5 micron and non-volatile content of 58.5%.

Preparation of the Other Pigment Pastes (II) to (IX)

TABLE 2

| Pigment paste | (II) | (III) | (IV) | (V) | (VI) | (VII) | (VIII) | (IX) |
|---|---|---|---|---|---|---|---|---|
| Aqueous varnish and amount (g) | (II) 100 | (III) 100 | (IV) 100 | (V) 100 | (VI) 100 | (VII) 100 | (VIII) 100 | (IX) 100 |
| Amount of water | 15 | 15 | 15 | 15 | 15 | 15 | 15 | 15 |
| Titanium pigment | 90 | 90 | 90 | 90 | 90 | 90 | 90 | 90 |

Preparation of resin powder (1)

A flask was charged with 62 parts of xylene and heated to 130° C. in a nitrogen blanket. A mixture of 38 parts of styrene, 37 parts of methyl methacrylate, 7 parts of 2-ethylhexyl acrylate, 10.3 parts of 2-hydroxyethyl acrylate, 7.7 parts of methacrylic acid and 4 parts of azobisisobutylonitrile was added dropwise for 3 hours at 130° C. at which it was kept for 30 minutes. Then, a mixture of 0.5 parts of t-butylperoxy-2-ethyl hexanoate and 5 parts of xylene was added dropwise over 30 minutes. The mixture was aged for 3 hours and then the solvent was removed to obtain an acrylic resin having an acid value of 50 and a hydroxyl value of 50. The resin was ground by a grinder and then seived with a 150 mesh sieve to obtain powder having a particle size of not more 100 micron.

Preparation of resin powder (2)

In the same manner as mentioned in preparation of resin powder (1), 231 parts of styrene, 56.0 parts of methyl methacrylate, 15.3 parts of 2-ethylhexyl acrylate, and 7.7 parts of acrylic acid were polymerized to obtain an acrylic resin having an acid value of 60.

Next, 100 parts of the acrylic resin and a crosslinking agent (melamine resin available as Cymel 303) were blended with 40 parts of an epoxy modified acrylic resin having an epoxy value of 540, a number average molecular weight of 4,200 and a glass transition temperature of 70° C. (available from Dainippon Inc and Chemicals Co., Ltd. as Fine Dic A217) at 100° C. and, after cooling, ground to 50 micron.

Preparation of resin powder (3)

In the same manner as mentioned in preparation of resin powder (2), 20.0 parts of styrene, 68 parts of methyl methacrylate, 10.4 parts of ethylhexyl acrylate, 68.0 parts of methyl methacrylate and 10.4 parts of ethylhexyl acrylate were polymerized to obtain an acrylic resin. The acrylic resin was treated as generally described for resin powder (2) to obtain resin powder (3).

EXAMPLE 1

Firstly, 45 g of the resin powder (1) was slowly added to 100 g of the aqueous resin varnish (I) and, on finishing addition, mixed with stirring for 15 minutes at 70° C. to obtain a stable dispersion having an average particle size of 1 micron.

Next, 205 g of the pigment paste (1) was added to the obtained dispersion and 26 g of a crosslinking agent (a water soluble melamine resin available from Mitsui Toatsu Co., Ltd. as Cymel 303) was added and mixed with stirring to obtain a paint composition.

EXAMPLES 2 TO 5 AND COMPARATIVE EXAMPLES 1 TO 6

Paint compositions were prepared by employing components shown in Table 3, as generally described in Example 1.

TABLE 3

| | Example | | | | Comparative Example | | | | | |
|---|---|---|---|---|---|---|---|---|---|---|
| | 2 | 3 | 4 | 5 | 1 | 2 | 3 | 4 | 5 | 6 |
| Aqueous varnish and amount | (II) 100 | (III) 100 | (VI) 100 | (IX) 100 | (I) 100 | (I) 100 | (IV) 100 | (V) 100 | (VII) 100 | (VIII) 100 |
| Resin powder and amount | (2) 40 | (1) 35 | (2) 60 | (1) 45 | — | (3) 45 | (1) 45 | (1) 45 | (1) 45 | (1) 45 |
| Dispersion temperature and time (min) | 70° C. X15 | 70° C. X15 | 70° C. X15 | 70° C. X15 | 70° C. X15 | 70° C. X15 | 70° C. X15 | 70° C. X15 | 70° C. X15 | 70° C. X15 |
| Pigment paste and amount | (II) 205 | (III) 205 | (VI) 205 | (IX) 205 | (I) 205 | (I) 205 | (IV) 205 | (V) 205 | (VII) 205 | (VIII) 205 |
| Crosslinking agent and amount | Cymel 325 45 | Cymel 325 35 | Cymel 303 30 | Cymel 303 39 | Cymel 303 39 | Cymel 303 39 | Cymel 303 39 | Cymel 303 39 | Cymel 303 39 | Cymel 303 39 |
| Ratio of aqueous | 60/40 | 60/35 | 60/60 | 60/45 | 60/0 | 60/45 | 60/45 | 60/45 | 60/45 | 60/45 |

TABLE 3-continued

|  | Example | | | | Comparative Example | | | | | |
| --- | --- | --- | --- | --- | --- | --- | --- | --- | --- | --- |
|  | 2 | 3 | 4 | 5 | 1 | 2 | 3 | 4 | 5 | 6 |
| resin/powder resin (solid content) | | | | | | | | | | |

The above paint composition was diluted with water to a viscosity of 40 seconds at 25° C. by #4 Ford cup and coated on a polished steel panel at 80% relative humidity and at 25° C. The coated panel was baked at 150° C. for 30 minutes to obtain a cured film of which sag resistance and gloss at 35 micron thickness were in Table 4.

TABLE 4

|  | Example | | | | | Comparative Example | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Sag limiting Thickness (μ) | 50 | 53 | 45 | 45 | 47 | 13 | 45 | 48 | 40 | 15 | 25 |
| Gloss (20°) | 89 | 82 | 85 | 86 | 86 | 73 | 70 | 57 | 48 | 85 | 86 |

Also, the viscosity of the above paint composition was adjusted to 80 ku (Stormer viscometer) and stored at 40° C. for 30 days. Dispersion stability of the paint composition was evaluated. In Comparative Examples 3 and 4, sedimentation was seen, but the others had no sedimentation.

What is claimed is:

1. An aqueous coating composition comprising (A) 100 parts by weight of an acrylic resin powder having an acid value of 15 to 200, (B) 25 to 900 parts by weight of an acrylic graft polymer having an acid value of 20 to 100, which is composed of a polymer portion (1) having an acid value of not more than 15 and an acrylic polymer portion (2) having an acid value of 40 to 200, and (C) 3 to 900 parts by weight of a curing agent for curing the component (A), the component (B) or both the components (A) and (B).

2. The aqueous coating composition according to claim 1 wherein the acrylic resin (A) has a hydroxyl value of 10 to 100.

3. The aqueous coating composition according to claim 1 wherein the acrylic graft polymer (B) has a hydroxyl value of 20 to 200.

4. The aqueous coating composition according to claim 1 wherein a graft point of the acrylic graft polymer (B) is formed by a reaction of an acid group with a glycidyl group.

5. The aqueous coating composition according to claim 4 wherein the acid group for forming the graft point is a sulfonic acid group or a phosphoric acid group.

* * * * *